United States Patent [19]

Bauer

[11] Patent Number: 4,563,036

[45] Date of Patent: Jan. 7, 1986

[54] VEHICLE ROOF WITH A COVER WHICH CLOSES A ROOF OPENING AND IS AT LEAST CAPABLE OF BEING SWUNG OUT

[75] Inventor: Kurt Bauer, Eberstadt, Fed. Rep. of Germany

[73] Assignee: Karosseriewerke Weinsberg GmbH, Weinsberg, Fed. Rep. of Germany

[21] Appl. No.: 459,670

[22] Filed: Jan. 20, 1983

[30] Foreign Application Priority Data

Jan. 21, 1982 [DE] Fed. Rep. of Germany ....... 3201806

[51] Int. Cl.$^4$ .............................. B60J 7/10; B60J 7/18
[52] U.S. Cl. .................................... 296/218; 296/223; 296/224; 49/465
[58] Field of Search ............................... 296/216–218, 296/221–224; 49/465

[56] References Cited

U.S. PATENT DOCUMENTS 4,332,416 6/1982 Lutz et al. ............................ 296/222
4,403,805 9/1983 Strem, Jr. et al. .................. 296/222
4,422,687 12/1983 Kaltz et al. ......................... 296/221

FOREIGN PATENT DOCUMENTS 2813650 10/1979 Fed. Rep. of Germany ...... 296/218
3045364 7/1982 Fed. Rep. of Germany ...... 296/223

Primary Examiner—Robert B. Reeves
Assistant Examiner—Dennis H. Pedder
Attorney, Agent, or Firm—Toren, McGeady, Stanger, Goldberg & Kiel

[57] ABSTRACT

To achieve minimum manufacturing and assembly costs a locking system for a cover in a vehicle roof is located in the area of the rear end of the cover. At its front end the cover is pivotally hinged about an axis, directed transversely to the driving direction, and its rear end is supported by a swinging-out or lifting device, formed by curved segment-shaped supports. The curved segment-shaped supports include laterally cantilevered lugs one of which engages in an operating slot guide in the cover and the other is engageable in a locking slot guide, also in the cover.

10 Claims, 4 Drawing Figures

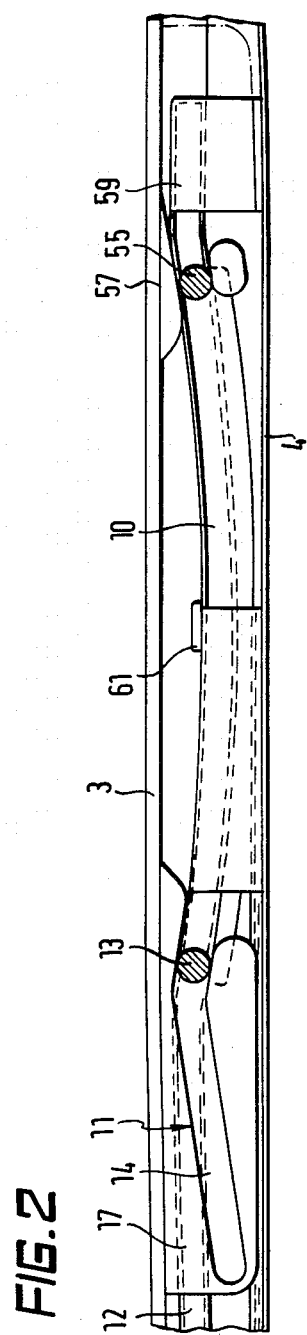
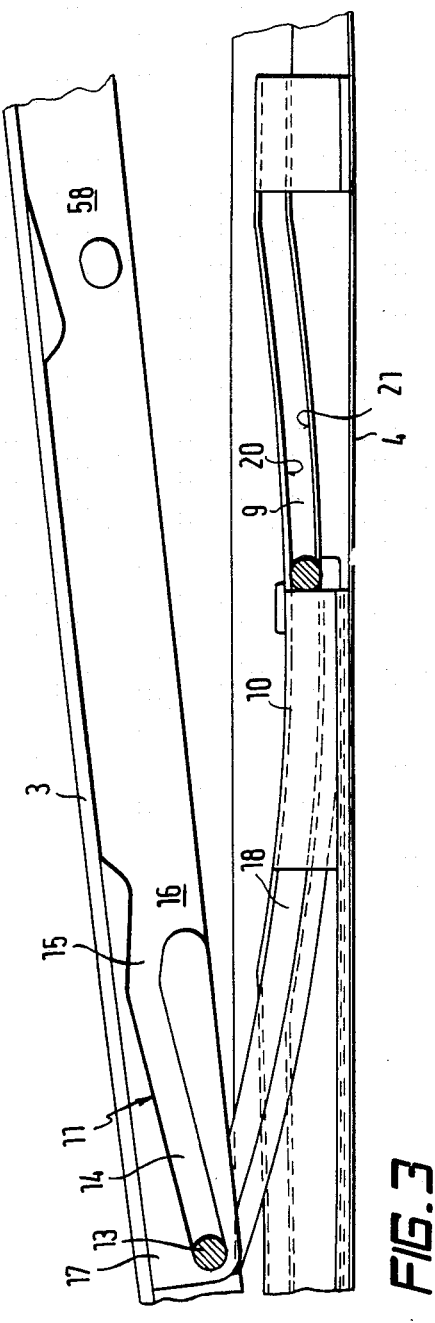
FIG.2
FIG.3

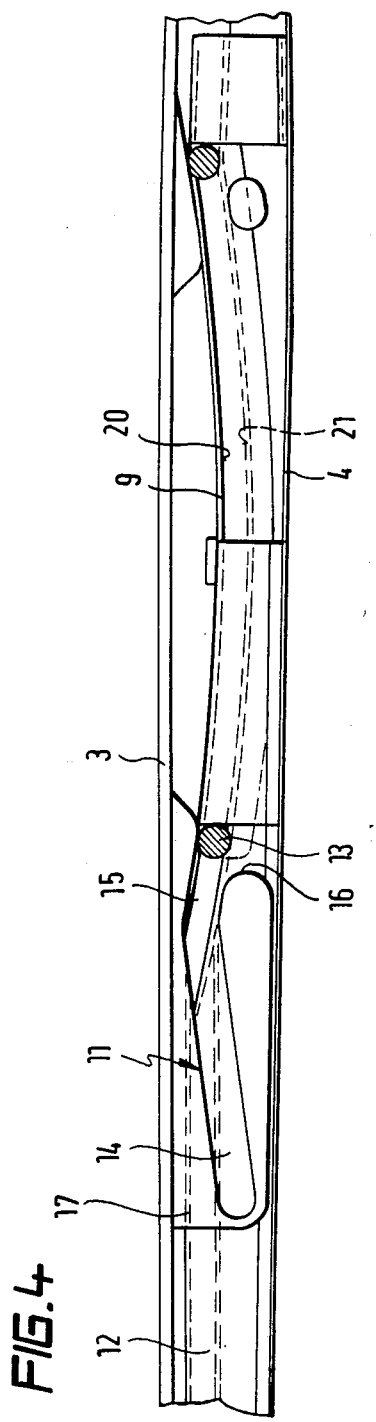

VEHICLE ROOF WITH A COVER WHICH CLOSES A ROOF OPENING AND IS AT LEAST CAPABLE OF BEING SWUNG OUT

BACKGROUND OF THE INVENTION

1. Field of the Invention

The invention relates to a vehicle roof with a cover which closes a roof opening and can be removed into a swung out position. The cover is hinged in the area of one end so as to be pivoted at a stationary or movable support and it can be moved back and forth by means of a lifting device, arranged at a distance from its hinge axis, between the swung-out position in which it projects outwardly from the plane of the roof and a closed position in which it is aligned with the roof plane, The lifting device includes one curved segment-shaped driveable support which is slidably guided in a correspondingly shaped friction bearing and which engages by means of a laterally cantilevered lug into a slot guide, having two sections with one section serving to equalize the relative motion between the curved segment-shaped support and the cover, and the other section which is aligned parallel to the path of motion of the curved segment-shaped support and serves to lock the cover in the closed position, in accordance with the Federal Republic of Germany patent P No. 30 45 364.6-21.

2. Description of the Prior Art

The lifting device, suggested in the main patent mentioned above, makes it possible to move the cover back and forth between its closed position in which it lies in the roof plane and one or more swung out positions relative to the closed position with a minimum expenditure for the lifting device, in a reliable manner and without danger of jamming. The lifting device makes it possible to also lock the cover in its closed position, aligned in the roof plane, with the aid of a curved segment-shaped support. Here the locking point lies at a considerable distance from the rear end of the cover so that aerodynamic forces which act on the cover may cause a certain fluttering of the cover, locked in its closed position.

The invention is therefore based on the task of improving the lifting device according to the main patent for a cover which can be moved to a swung out and lifted out position and also closes a roof opening in a vehicle roof in such a way that, at a minimum manufacturing expense and without impairing the detachability of the cover, the cover has a lock spaced from its rear end for the closed position where the cover is in alignment with the roof plane.

SUMMARY OF THE INVENTION

This task is solved in a vehicle roof, particularly in a lifting device according to the main patent in that an additional slot guide is provided at the cover and is open at both ends and ascends towards the rear end of the lug in the plane of the cover and is associated with a second laterally cantilevered lug, arranged at the end of the curved segment-shaped support, and facing away from the cover hinge. The distance between the facing ends of the first bent slot guide and the second slot guide, open at both ends, is smaller by the amount of the diameter of both lugs of the curved segment-shaped support than the length of the curved segment-shaped support in such a way that the curved segment-shaped support is in engagement with both slot guides in a center position which forms simultaneously the locking position for the cover. In this way, it is achieved that the cover in its closed position, location the roof plane, is not only locked by means of the front lug of the curved segment-shaped support which engages in the first slot guide at a relatively large distance from the rear cover end, but is also locked against the supporting frame by means of the lug of the curved segment-shaped support which engages in the second slot guide at a relatively small distance from the rear edge of the cover. Thus any possible fluttering movements of the rear cover end are completely excluded. Since the second slot guide which is open at both ends is very short, neither the detachability of the cover nor the swinging out or moving in of the cover in its closed position is impaired by the arrangement of this additional slot guide.

In a preferred development of the invention, an end stop for the curved segment-shaped support, attached at the supporting frame which engages under the roof opening, is connected after the second slot guide, open on both ends, wherein this end stop is arranged at a certain distance from the rear end of the slot guide in such a way that the cover can be removed without effort when the curved segment-shaped support rests at the stop.

Advantageously, curved segment-shaped support has smooth surfaces and is driven by means of a traction and thrust member, particularly a threaded cable, which acts at its front end, facing the cover hinge.

In a particularly preferred embodiment, the curved segment-shaped support is held and guided in a depression-shaped slide guidance which consists of an uppper and a lower portion and which is attached at the supporting frame by means of a bolt which penetrates a longitudinally directed slot recess of the curved segment-shaped support. The depression-shaped slide guidance which holds and guides the curved segment-shaped support may advantageously be formed by a part of a cable guidance for the threaded cable, attached at the supporting frame.

BRIEF DESCRIPTION OF THE DRAWING

The invention is elucidated below with the aid of an exemplified embodiment shown in the drawing. In the drawing

FIG. 2 is a side view of the lifting device according to FIG. 1 while the cover is in the closed position and is locked with respect to the roof plane.

FIG. 3 is a side view according to FIG. 2, however the cover is in the swung-out position.

FIG. 4 is a side view according to FIGS. 2 and 3 in the position of the lifting device which corresponds to the removal of this cover.

DESCRIPTION OF THE PREFERRED EMBODIMENT

Figure 1:
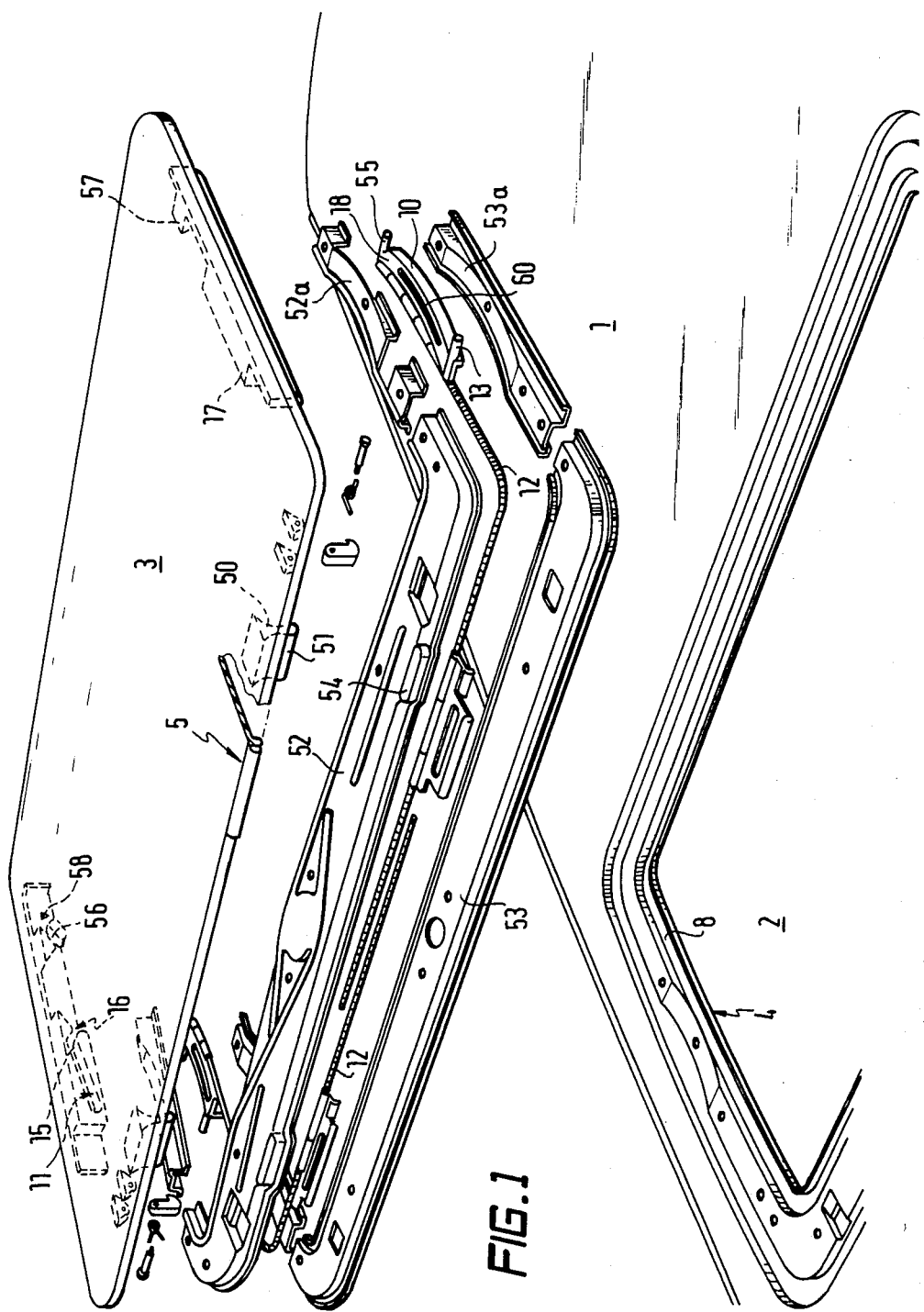
FIG. 1 shows an exploded perspective view of a vehicle roof which is provided with a cover which can be swung out and removed and which closes a roof opening.

A roof opening 2, provided in the roof 1 of a vehicle, can be closed by means of a cover 3 which can be swung out and removed. A supporting frame 4 engages under the roof opening 2. At its front end 5, the cover 3 is held pivotally and removably in a cable guidance, consisting of an upper portion 52 and a lower portion 53, by means of pivot bearing lugs 51 which are attached at supporting parts 50, wherein the pivot bearing lugs 51 penetrate recesses 54 in the upper portion 52 of the cable guidance. In the area of its rear end, the cover 3 is supported at its two longitudinal sides, that is, the sides extending in the longitudinal or travel direction of the vehicle, by means of one lifting device which is attached at the bottom 8 of the supporting frame 4. The lifting devices comprise a curved segment-shaped support 10 which is guided to be longitudinally slidable in a correspondingly shaped friction bearing 9, and a slot guide 11 which is arranged in a plane at an acute angle relative to the roof plane, as well as a threaded cable 12 to drive the curved segment-shaped supports 10. The curved segment-shaped support 10 is in engagement with the slot guide 11 by means of a laterally cantilevered lug 13. The slot guide 11 has a first section 14 which is assigned to equalize the relative motion between the cover and the curved segment-shaped support during swinging in and out of the cover 3. Following this first section 14 of the slot guide 11, there is an additional section 15 which is angular and downwardly directed relative to first section 14 and which is aligned parallel to the plane of movement of the curved segment-shaped support 10. In the area of its rear end, at the section 15 of the slot guide 11 a downwardly open recess 16 is connected. In the illustrated positions, the slot guide 11 in its entirety is installed in a block 17 which is attached perpendicularly to the cover 3. The curved segment-shaped support 10 has an L-shaped cross-section and is guided by means of its longer flange or leg 18 of the L-shaped cross-section at corresponding bearing surfaces 20 and 21 of the friction bearing 9. Bearing surface 20 is convex and bearing surface 21 is concave. For secure locking of the cover 3, when located in the closed position aligned in the roof plane, in the area of its rear end, at the end of the curved segment-shaped support 10 more remote from the cover hinge 50/51, a second laterally cantilevered lug 55 is arranged to which an additional, short slot guide 56, open at both ends, is assigned so that it is inclined upwardly towards the rear end of the cover 3. The slot guide 56 is, as the slot guide 11, installed in a block 57 whic is attached perpendicularly to the cover 3. In the direction towards the free or rear end of the cover 3, the movement of the curved segment-shaped support is limited by a stop 59 which is arranged at a distance from the open end 58 of the slot guide 56 and is attached at the supporting frame 4. In the shown embodiment, the curved segment-shaped support 10 is held in a depression-shaped slide guidance, consisting of an upper part 52a and a lower part 53a, which is constructed in one piece with the cable guidance which is formed of an upper part 52 and a lower part 53. The slide guidance is attached at the bottom 8 of the supporting frame 4 by means of a bolt 61 which penetrates a longitudinally directed slot recess 60 of the curved segment-shaped support 10.

As is visible particularly in the illustration of FIG. 2, the cover 3 is secured at two points in its closed position, aligned with the roof plane, by means of lugs 13 and 55 of the curved segment-shaped support 10 of which one lug engages in section 15 of the slot guide 11 and the other in the slot guide 56, wherein the rear locking point lies closely to the rear end of the cover 3 and consequently guarantees a secure locking also of the rear ends of the cover 3.

It is visible from the illustration of FIG. 4 that the additional, rear lock of the cover 3 does not impair its outward and inward swinging motion in any way. In FIG. 4, the unlocked position of the cover is shown in which the cover can be lifted upwardly out of the roof plane. Thereat the front lug 13 of the curved segment-shaped support 10 is in the area of the downwardly open recess 16 of the slot guide 11 and the rear lug 55 of the curved segment-shaped support 10 is in the area of the downwardly open, rear end 58 of the slot recess 56. In connection with the special design of the hinge of the cover at its front edge, this arrangement makes possible an upward pivotal lifting of the cover from the vehicle roof and also a pivotal insertion of the cover into the roof opening 2 which greatly simplifies handling of the cover 3.

I claim:

1. A vehicle roof having a roof opening, a cover for closing the roof opening and being movable between a closed position and an open position, said cover having a first end and a second end spaced apart in the normal travel direction of the vehicle and a pair of sides extending between said first and second ends, said first end leading said second end in the normal travel direction, said cover can be swung out from the closed position to the open position and in the area of its first end is hinged pivotally about a pivot axis extending generally parallel to said first end, a lifting device arranged for pivoting said cover between the open position in which it projects upwardly from the plane of said roof and the closed position in which said cover is located in the plane of said roof, said lifting device is arranged along at least one of said sides at a distance spaced from the pivot axis, wherein said lifting device comprises at least one unitary segment-shaped support having oppositely directed curved surfaces extending and curved in the direction between the first end and second end, a friction bearing having curved bearing surfaces shaped to correspond to and to movably guide said curved surfaces on said support, said support being positioned within and movable relative to said friction bearing, means for guiding said support comprising a first slot guide secured to said cover, said support having a first cantilevered lug extending outwardly therefrom transversely of the direction of said sides into said first slot guide, said first slot guide having two serially arranged sections disposed angularly relative to one another, with one said section serving to equalize the relative motion between said curved segment-shaped support and said cover, and said other section, aligned parallel to the path of motion of said segment-shaped support, serving to secure said cover in its closed position, wherein the improvement comprises that said first cantilevered lug is located adjacent the end of said support closer to said first end, a second cantilevered lug (55) extending outwardly from the same surface of said support as said first lug is arranged adjacent the opposite end of said curved segment-shaped support (10) from said first lug, a second slot guide separate and spaced from said first slot guide (56) is secured to said cover (3) and is open on both ends spaced apart in the direction of said sides extending between the first and second ends and is located closer to the second end of said cover relative to said first slot guide and in the closed position of said cover slopes upwardly towards the second end of said cover (3), and said first lug remains in said first guide slot in the open and closed position of said cover while said second lug is located in said second slot guide in the closed position of said cover and is displaced from said second slot guide in the open position of said cover.

2. A vehicle roof according to claim 1, characterized in that the spacing of the adjacent ends of said first slot guide (11) and said second slot guide (56), is smaller by the amount of the diameters of said two first and second lugs (13 and 55) than the length of said curved segment-shaped support (10).

3. A vehicle roof according to claim 2, characterized in that a supporting frame (4) is provided around the roof opening, an end stop (59) is attached at said supporting frame (4) and is connected adjacent the end of said second slot guide (56) closer to the second end of said cover.

4. A vehicle roof according to claim 3, characterized in that said curved segment-shaped support (10) has smooth surfaces, a traction and thrust member is arranged to drive said support.

5. A vehicle roof according to claim 4, including means for forming a depression-shaped slide guidance, said curved segment-shaped support (10) is held and guided in said depression-shaped slide guidance, said slide guidance means is comprised of an upper portion (52a) and a lower portion (53a), a bolt (61) for attaching said upper portion and lower portion to said supporting frame (4), said curved segment-shaped support (10) forms a longitudinally directed slot recess (60) and said bolt (61) extends into said slot recess (60).

6. A vehicle roof according to claim 5, characterized in that a cable guidance forms said depression-shaped slide guidance (52a/53a) which holds and guides said curved segment-shaped support (10), said cable guidance is attached to said supporting frame and includes an upper part (52) and a lower part (53).

7. A vehicle roof according to claim 6, characterized in that said curved segment-shaped support (10) has an L-shaped profile cross-section having a longer profile side and a shorter profile side and is held with said longer profile side in said depression-shaped slide guidance (52a/53a).

8. A vehicle roof according to claim 4, wherein said traction and thrust member is a threaded cable which engages said support at the end thereof closer to the first end of said cover.

9. A vehicle roof having a roof opening, a cover for closing the roof opening and being movable between a closed position and an open position, said cover having a first end and a second end spaced apart in the normal travel direction of said vehicle with the first end leading the second end and a pair of sides extending between said first and second ends, said cover is pivotally hinged at the first end thereof about an axis extending generally parallel to said first end, and can be pivoted relative to the roof opening between the closed position and the open position, a lifting device is arranged for pivoting said cover between the open position in which it projects at the second end thereof upwardly from the plane of said roof and the closed position in which said cover is located in the plane of said roof closing the roof opening, said lifting device is arranged along at least one of said sides at a distance from the hinge axis, said lifting device comprises at least one segment-shaped support extending in the direction between the first end and the second end of said cover and having surfaces curved in the first end-second end direction, a supporting frame secured to the underside of said vehicle roof and extending around said roof opening, a friction bearing located in said supporting frame and having surfaces curved in the first end-second end direction corresponding to the curved surfaces on said support so that the curved surfaces on said support are guided during movement of said support on said curved surface on said bearing, said curved support being positioned within and movable relative to said friction bearing, a first block secured to and extending downwardly from said cover along said at least one of said sides, a second block secured to said cover in spaced relation to said first block and extending along said at least one of said sides and being located closer to said second end of said cover than said first block, a first slot guide formed in said first block and extending in the direction between said first and second ends of said cover and being closed at the end thereof closer to the first end of said cover and open at the opposite end thereof, a second slot guide located in said second block and extending in the direction between said first and second ends of said cover and being open at the opposite ends thereof, a first lug laterally cantilevered outwardly from said support and arranged for movable engagement within said first slot guide, a second lug laterally cantilevered out from said support and arranged to engage within said second slot guide only in the closed position of said cover and being displaced out of said second slot guide in the open position of said cover, and means attached to said support for moving said support in said friction bearing with said first and second lugs guiding said support in said first and second slot guides.

10. A vehicle roof, as set forth in claim 9, wherein said curved segment-shaped support has a first upper surface and a second lower surface and said first surface is convex and said second surface is concave, and said friction bearing having similarly curved surfaces for movable engagement with the first and second surfaces on said support.

* * * * *